M. CAMPBELL.
Metal-Bucket.

No. 8,800. Reissued July 15, 1879.

Witnesses.
A. Ruppert,
W. N. Severance

M. Campbell
Inventor.
D. P. Holloway & Co
Atty.

N. PETERS, PHOTO-LITHOGRAPHER, WASHINGTON, D. C.

UNITED STATES PATENT OFFICE.

MARVIN CAMPBELL, OF SOUTH BEND, INDIANA.

IMPROVEMENT IN METAL BUCKETS.

Specification forming part of Letters Patent No. 205,242, dated June 25, 1878; Reissue No. 8,800, dated July 15, 1879; application filed February 7, 1879.

*To all whom it may concern:*

Be it known that I, MARVIN CAMPBELL, of South Bend, in the county of St. Joseph and State of Indiana, have invented certain new and useful Improvements in Metal Buckets; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

My invention consists of a bucket or other like vessel, to the bottom of which is secured a supplementary bottom, in the manner substantially as hereinafter set forth.

Figure 1:
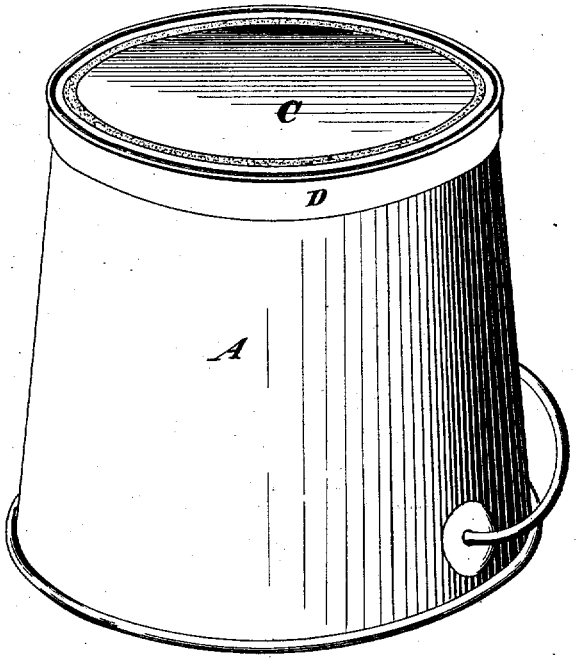
Figure 2:
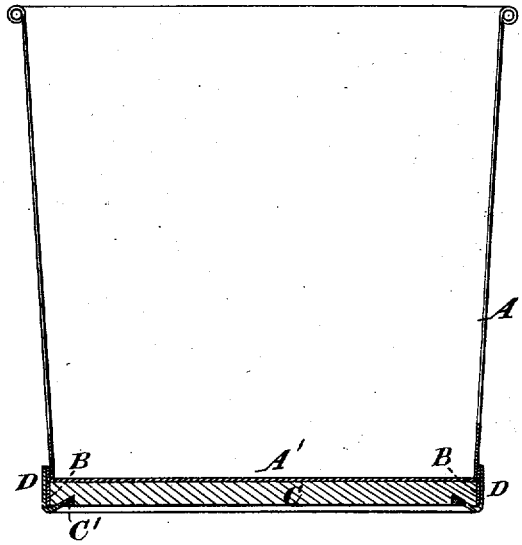
Figure 3:
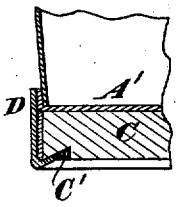

In the annexed drawings, making part of this specification, Figure 1 is a perspective view of a bucket bottom side up. Fig. 2 is a section thereof.

The same letters are employed in both figures in the indication of identical parts.

The body of the bucket A and the bottom A′ are made in the ordinary manner of sheet-tin or other suitable metal. A supplementary bottom of wood, paper, or other suitable material is then placed on the bearing against the bottom A′. It is secured in its place by a ring, D, slipped over the bottom of the bucket and soldered to the body A, the width of the ring being such that it will extend below the supplementary bottom C sufficiently to allow a lip or burr to be turned down into a groove, C′, formed in the wooden bottom C, near its edge, before the flange or lip is turned down upon said bottom, which is pressed into the groove in the bottom C by a machine for such purpose, thus confining the supplementary bottom C in its place.

The groove or annular rabbet, being filled with paint when the bottom is coated, will render it utterly impossible for water from the outside to come in contact with the bottom A′, and if the bottom C is well painted or otherwise rendered impervious to water, the bottom A′ may become perforated, and the bottom C still prevent the escape of the contents of the bucket.

If desired, the body of the bucket may be carried below the bottom A′, as shown at B, so as to form a flange, within which the supplementary bottom C is inserted, and held in its place by the flange being turned over, forming the burr, in the same manner as was done with the ring, and thus discarding the ring.

What I claim, and desire to secure by Letters Patent, is—

A bucket or other like vessel combining in its construction a body and bottom of sheet metal, a wooden bottom, C, having an annular rabbet cut in its lower face near its edge, and a projection formed by a flange, B, or ring D, extending down over the edge of the wooden bottom and turned over into the annular rabbet, as and for the purposes substantially as described.

In testimony that I claim the foregoing I have hereunto set my hand this 17th day of December, 1878.

MARVIN CAMPBELL.

Witnesses:

JNO. G. MASON,

A. RUPPERT.